(12) United States Patent
Chen et al.

(10) Patent No.: US 6,704,300 B1
(45) Date of Patent: Mar. 9, 2004

(54) METHOD AND SYSTEM FOR ACQUISITION OF A TIME STAMPED SIGNAL

(75) Inventors: Xixian Chen, Nepean (CA); Song Zhang, Kanata (CA); Shiquan Wu, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/374,000

(22) Filed: Aug. 16, 1999

(51) Int. Cl.[7] .................................................. H04J 3/06

(52) U.S. Cl. ..................... 370/350; 370/509; 455/456

(58) Field of Search ............................. 370/509, 512, 370/503, 321, 324, 328, 350; 375/326, 343; 455/456; 342/357.01, 450

(56) References Cited

U.S. PATENT DOCUMENTS 5,890,068 A * 3/1999 Fattouche et al. ........... 455/456

OTHER PUBLICATIONS

So et al, Target Localisation In Presence of Multipaths, Electronics Letters, vol. 29, No. 3, pp. 293–294, Feb. 4, 1993.*

* cited by examiner

*Primary Examiner*—Dang Ton
*Assistant Examiner*—Frank Duong

(57) ABSTRACT

The invention is directed to a method and system for acquisition of a time stamped signal burst while preserving timing information. A system for acquisition of a time stamped signal burst while preserving timing information. The system includes a first framer, an offset frequency compensator and a second framer. The first framer is for framing a buffered signal burst using least mean squares tuning to produce a first time stamp. The offset frequency compensator is for substantially removing a frequency offset from the first time stamp to produce a rough signal burst. The second framer is for framing the rough signal burst using least mean squares tuning to produce a fine signal burst arid a second time stamp, the second time stamp being more reliable than the first time stamp. A method system or acquisition of a time stamped signal burst while preserving timing information including the steps of framing using LMS and compensating for frequency offset. An advantage of the invention is increased reliability of the time stamp of the acquired signal burst.

28 Claims, 4 Drawing Sheets

METHOD AND SYSTEM FOR ACQUISITION OF A TIME STAMPED SIGNAL

FIELD OF THE INVENTION

The present invention relates generally to signal burst acquisition and more particularly to a method and system for acquisition of a time stamped signal.

BACKGROUND OF THE INVENTION

Emergency 911 service is rapidly becoming essential in today's society. One of the compelling reasons for using the existing landline emergency 911 system is the ability to trace the caller's location. Using databases in the telephone network switches, the caller's location is determined and made available to the emergency services. In the event the caller is unable to inform the operator of their location, the ability to trace the call is invaluable.

The explosive growth of mobile phones, however, causes complications for emergency 911 services. While mobile users may call the 911 operator just as they would using a landline phone, there is no ability to trace the exact location of the mobile caller. The emergency 911 operator currently can only trace the mobile call to the base station closest to the mobile caller is using.

Mobile systems with the ability to locate mobile callers are known as enhanced 911 wireless or E911 systems. One known approach to determine a mobile caller's location involves using an improved handset. These handset improvements, however, involve improved handset circuitry that increases the cost of the handsets. Further, the extra circuitry requires extra battery power. Moreover, deployment of the improvement takes time since it depends on the users upgrading their handsets.

Another approach would not modify the handsets, thereby avoiding the problems stated above. The so-called network approach involves modifying the base stations. One such approach is known as Time Difference Of Arrival or TDOA. One method of TDOA involves measuring the Time Of Arrive (TOA) of the mobile's signals at multiple base stations. The TOAs are then sent to the Central Office and subtracted to get a measurements of TDOA between base stations. These TDOA parameters are then used to locate the mobile's position using standard hyperbolic locating techniques.

Measuring the TOAs involves detecting the starting position of the received signal and also providing a time stamp. Conventionally, this is known as burst acquisition and clock recovery. Conventional burst acquisition and clock recovery algorithms, however, do not capture time delay information. Once the open-eye samples are obtained, the original raw data is discarded. There is a timing ambiguity the open eye samples are mapped to the original raw data. Thus, the conventional burst acquisition and clock recovery algorithms cannot be used for mobile locating.

Therefore, clearly there is a need to acquire a time stamped signal burst while preserving timing information.

SUMMARY OF THE INVENTION

The invention is directed to a method and system for acquisition of a time stamped signal burst while preserving timing information.

According to one aspect of the present invention, there is provided a system for acquisition of a time stamped signal burst while preserving timing information. The system includes a first framer, an offset frequency compensator and a second framer. The first framer is for framing a buffered signal burst using least mean squares tuning to produce a first time stamp. The offset frequency compensator is for substantially removing a frequency offset from the first time stamp to produce a rough signal burst. The second framer is for framing the rough signal burst using least mean squares tuning to produce a fine signal burst and a second time stamp, the second time stamp being more reliable than the first time stamp.

According to a further aspect of the present invention, there is provided a method for acquisition of a time stamped signal burst while preserving timing information including the steps of framing using LMS and compensating for frequency offset An advantage of the invention is increased reliability of the time stamp of the acquired signal burst.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The embodiments of the invention will now be described with reference to the accompanying drawings, in which.

Similar references are used in different figures to denote similar components.

DETAILED DESCRIPTION OF THE EMBODIMENTS

First, an overview of the invention is provided in general terms. Then, the embodiments if the invention, including the presently preferred embodiment, are described. The descriptions of the embodiments include description of the structure, operation and advantages of the embodiments, as well as alternatives.

Overview of the Invention

In general terms, the invention uses an accurate signal processing model and multi-stages (at least two stages) to acquire a time stamped signal burst while preserving timing information. The signal processing model uses a least mean squares (LMS) estimator that is more accurate and more robust than correlation alone because LMS corrects the residue error. Estimation of the time stamp is improved due to multi-stages because the frequency offset is substantially removed between the two of the stages.

Therefore, roughly speaking, the invention provides a starting position of a raw signal burst and its time stamp.

Acquisition in a flat fading and dispersive channel

Figure 1:
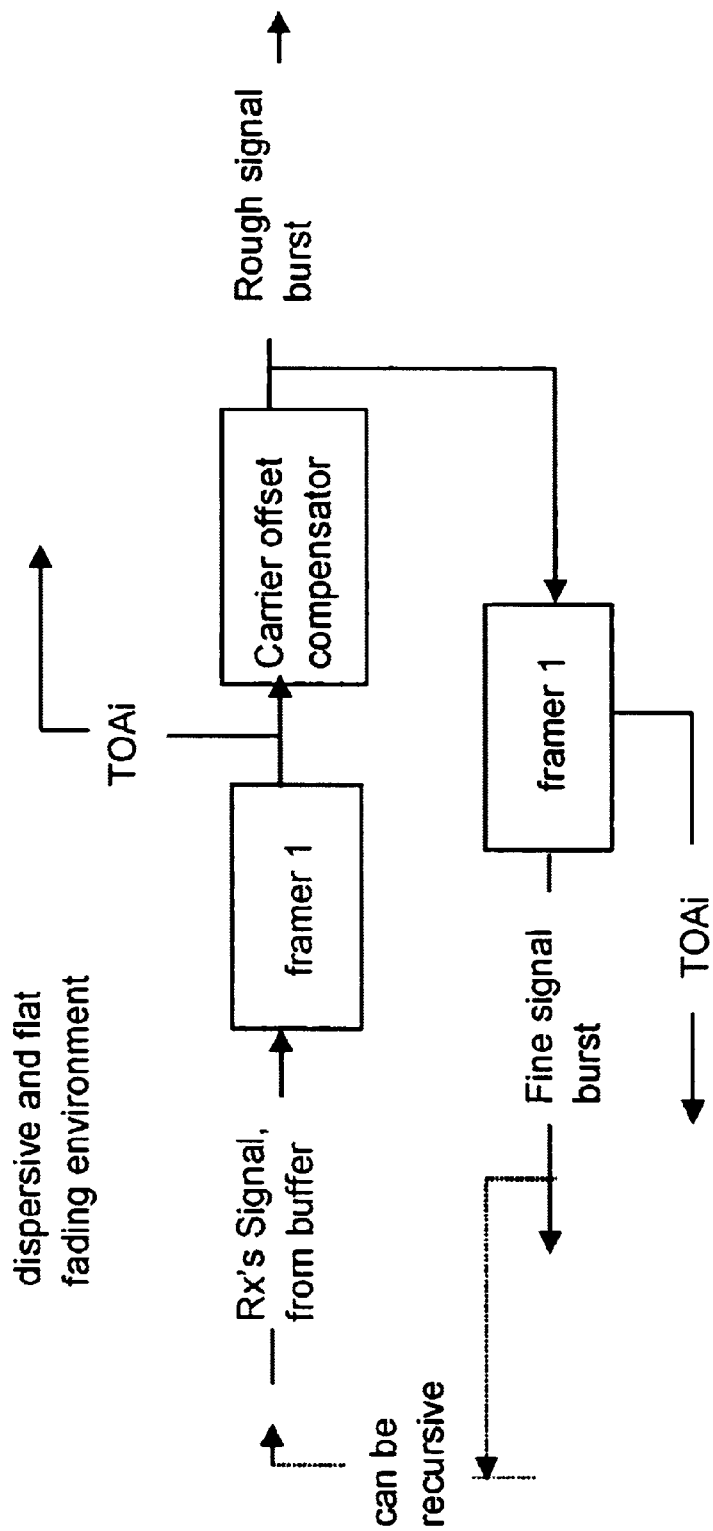
FIG. 1 is a block diagram of an embodiment of the invention for a flat fading and dispersive channel.
Figure 2:
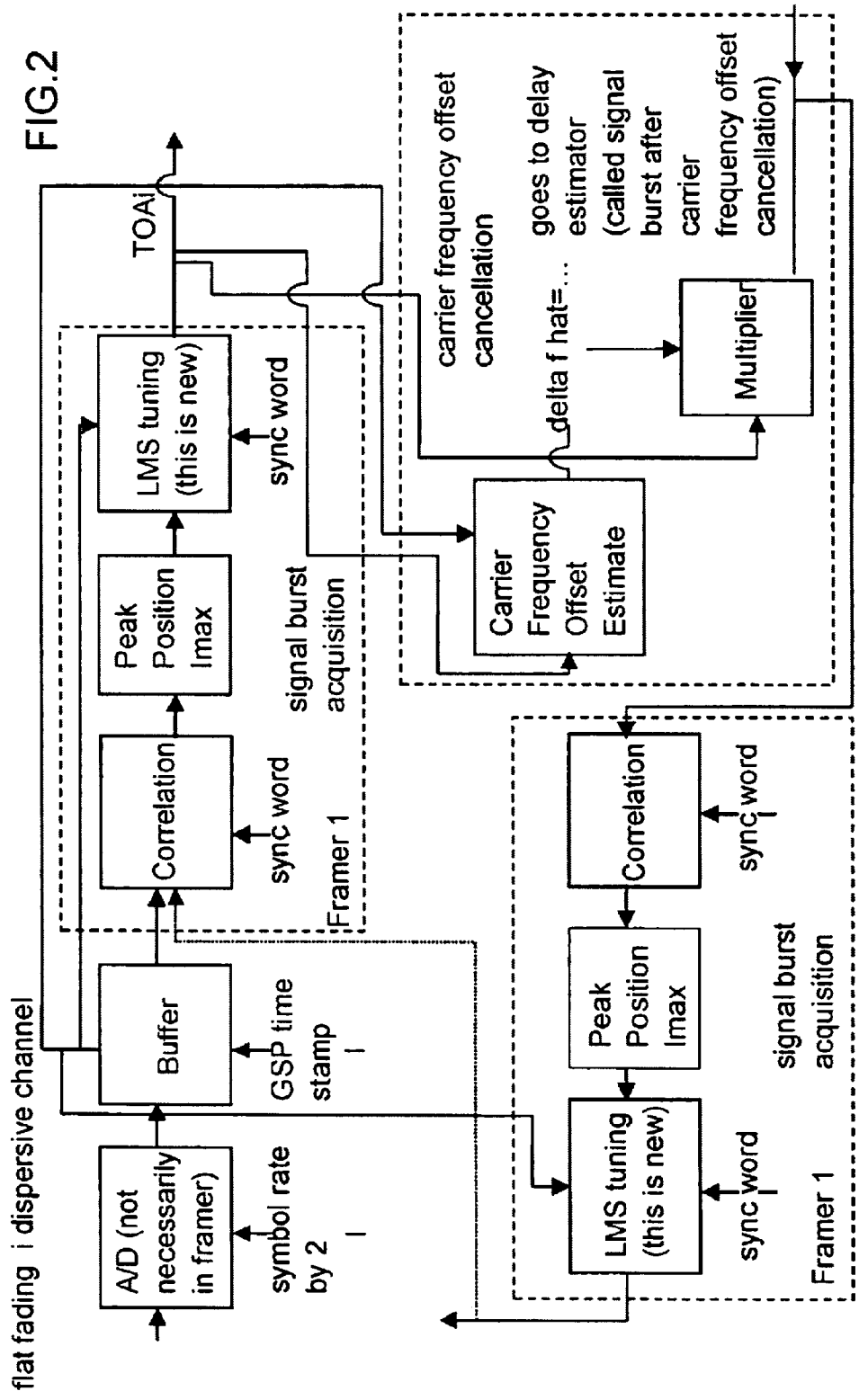
FIG. 2 is a more detailed block diagram of an embodiment of the invention for a flat fading and dispersive channel.

An embodiment of the invention operates when the channel is a flat fading and dispersive channel. The system is shown in FIG. 1 and FIG. 2.

The embodiment operates as follows.

Our invention basically works as below:

TDMA mobile signal is received by a wide-band digital receiver with the synchronized A/D converter at each cell site.

The received wide-band signal is then down-converted to the sampled baseband signal by a digital filter, which is buffered in baseband board with inserted GPS time stamps.

The Framer first uses SYNC word to grossly locate the signal burst boundary.

After the carrier frequency offset estimation and correction, the signal burst is then used by the clock phase estimator to estimate the sampling phase of the open-eye-sample sequence.

The grossly captured signal burst and the estimated sampling phase are used by the timing ambiguity solver to obtain two outputs: one is the raw data burst which contains the time delay information; the other is the open-eye-sample sequence derived from this raw data burst.

The starting position of the raw data burst is exactly aligned with the starting position of the open-eye-sample sequence.

The Framer uses the SYNC word again and correlates it with the derived open-eye-sample sequence.

From the resultant peak position, the Framer can find the starting position of the open-eye-sample sequence.

Since the starting position of the raw data burst is aligned with the starting position of the open-eye-sample sequence, the starting position of the raw data burst can thus be easily identified.

Since each raw data sample is time stamped by GPS receiver, the Framer can output the framed raw data burst and the time stamp of its starting position, TOAi.

The Time Delay Estimator will work on the framed raw data burst and output the intra-symbol delay estimate, TOAf, which will combined with the inter-symbol delay (TOAi) obtained from the Framer to form the final TOA estimate.

Signal Burst Acquisition

We use the SYNC word to locate the signal burst. It involves two steps. First the SYNC word is correlated with the received samples to get the gross estimate of the starting position of the received signal burst:

$$C(i) = \left| \sum_{k=1}^{L} a_S(k) x(kT + iT/2)^* \right| \qquad \text{Eqn. 1}$$

where $\{\alpha_s(1), \alpha_s(2), \ldots, \alpha_s(L)\}$ is the SYNC word, $x(kT+iT/2)$ is the received signal sampled at the double symbol rate, and the superscript "*" designates the complex-conjugate of a complex scalar. The initial time index of the starting position can be estimated by finding the peak position of $C(i)$ $$i_{max} = \arg\max\{C(i)\} \qquad \text{Eqn. 2}$$

After obtaining $i_{max}$, more complex searching algorithm is performed around it. To do this, we define the even and odd signal vectors as $$R_E(i) = \begin{bmatrix} x[iT] \\ x[(i+1)T] \\ \ldots \\ x[(L-P+i)T] \end{bmatrix} \qquad \text{Eqn. 3}$$

$$R_O(i) = \begin{bmatrix} x[iT/2] \\ x[(i+1)T + T/2] \\ \ldots \\ x[(L-P+i)T + T/2] \end{bmatrix} \qquad \text{Eqn. 4}$$

We define the SYNC word data matrix as $$A_S = \begin{bmatrix} a_S(P) & \cdots & a_S(1) \\ a_S(P+1) & \cdots & a_S(2) \\ \ldots & \ldots & \ldots \\ a_S(L) & \cdots & a_S(L-P+1) \end{bmatrix} \qquad \text{Eqn. 5}$$

The squared errors around the peak position of the correlation results are calculated as:

$$\epsilon(i) = |(I - A_S A'_S) R_E(i)|^2 + |(I - A_S A'_S) R_O(i)|^2 \qquad \text{Eqn. 6}$$

By finding its minimum value, we get more accurate time index of the starting position of the signal burst $$i_{min} = \arg\max\{\epsilon(i)\} \qquad \text{Eqn. 7}$$

Carrier Frequency Offset Estimation and Correction

In this section, we assume that the starting position of the signal burst has been obtained.

Again, we use the SYNC word for carrier frequency offset estimation based on Minimum Mean Square Error criterion. Let denote the estimate of the carrier frequency offset. We define the squared error, or objective function as $$\epsilon(\hat{d}) = |(I - A_S A'_S) \Phi_E(\hat{d})^{-1} R_E(i_{min})|^2 + |(I - A_S A'_S) \Phi_O(\hat{d})^{-1} R_O(i_{min})|^2 \qquad \text{Eqn. 8}$$

where $\Phi_E(\hat{d})$ and $\Phi_O(\hat{d})$ are the even and odd diagonal matrices whose elements on the leading diagonals are the phase rotation components $\beta_k(d) = e^{j2\pi d kT}$ and $\beta_{k+½}(d) = e^{j2\pi d kT + T/2}$ $$\Phi_E(d) = \begin{bmatrix} \beta_{N+1}(d) & & & \\ & \beta_{N+2}(d) & & \\ & & \ldots & \\ & & & \beta_{L-N}(d) \end{bmatrix} \qquad \text{Eqn. 9}$$

$$\Phi_O(d) = \begin{bmatrix} \beta_{N+1+1/2}(d) & & & \\ & \beta_{N+2+1/2}(d) & & \\ & & \ldots & \\ & & & \beta_{L-N+1/2}(d) \end{bmatrix} \qquad \text{Eqn. 10}$$

Assuming that the carrier frequency offset ranging from −300 Hz to 300 Hz, we may consider the following frequency points $$\hat{d}(m) = 20m - 300, \; m = 0, 1, \ldots, 15 \qquad \text{Eqn. 11}$$

and choose the one that minimizes the squared error of Eqn. 8.

After obtaining the estimate of the carrier frequency offset, the input signal is un-rotated by $$x(nT/2) = x(nT/2) e^{-j2\pi \hat{d} nT/2} \qquad \text{Eqn. 12}$$

This process will remove the residual carrier from the input signal.

Before ending this section, we would like to point out that the signal burst acquisition algorithm discussed in Section 3 and the carrier frequency offset estimation and correction algorithms discussed in this section are valid for both flat fading and dispersive channels. However, in the flat fading channel environment, more accurate signal burst acquisition algorithm will be discussed in the following two sections.

Acquisition in a Flat Fading Channel

Figure 3:
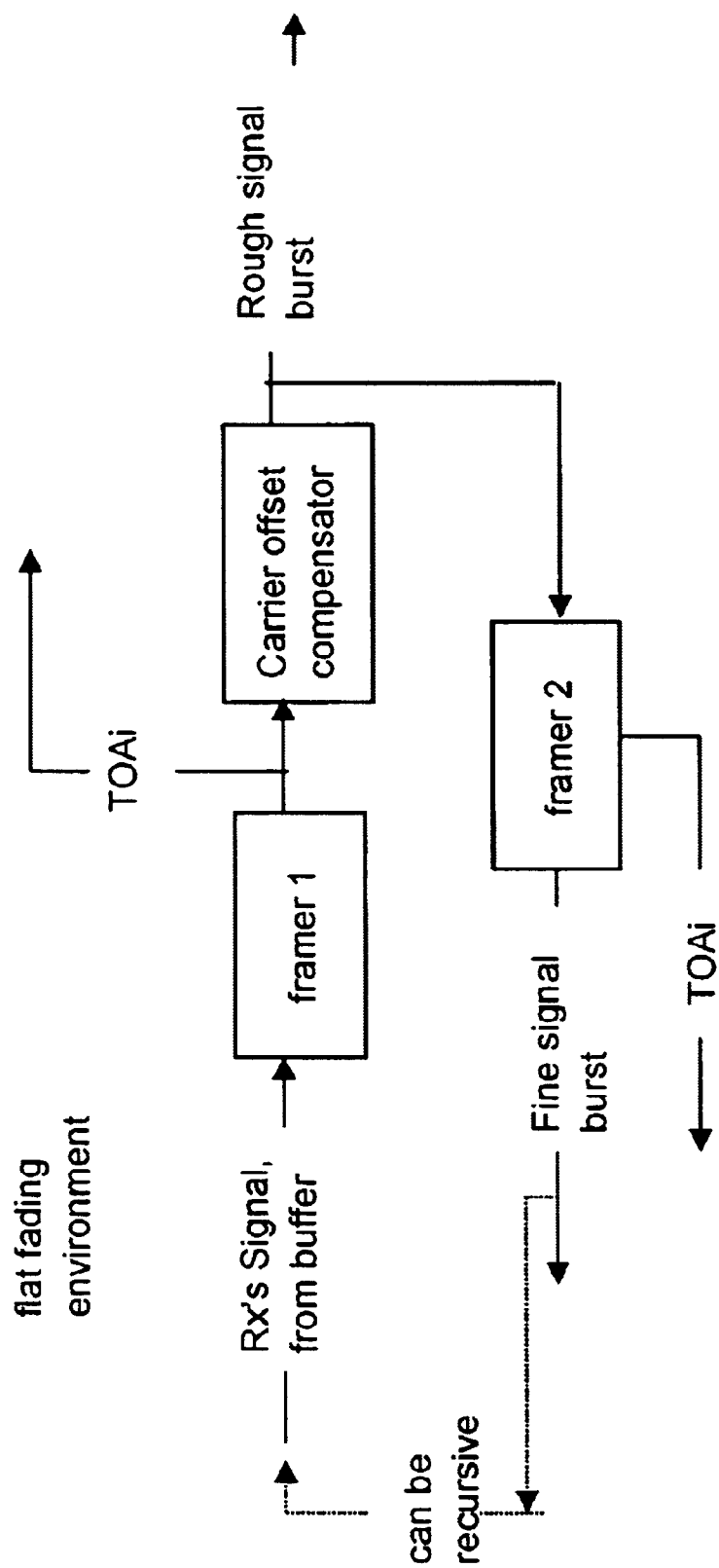
FIG. 3 is a block diagram of an embodiment of the invention for a flat fading channel.
Figure 4:
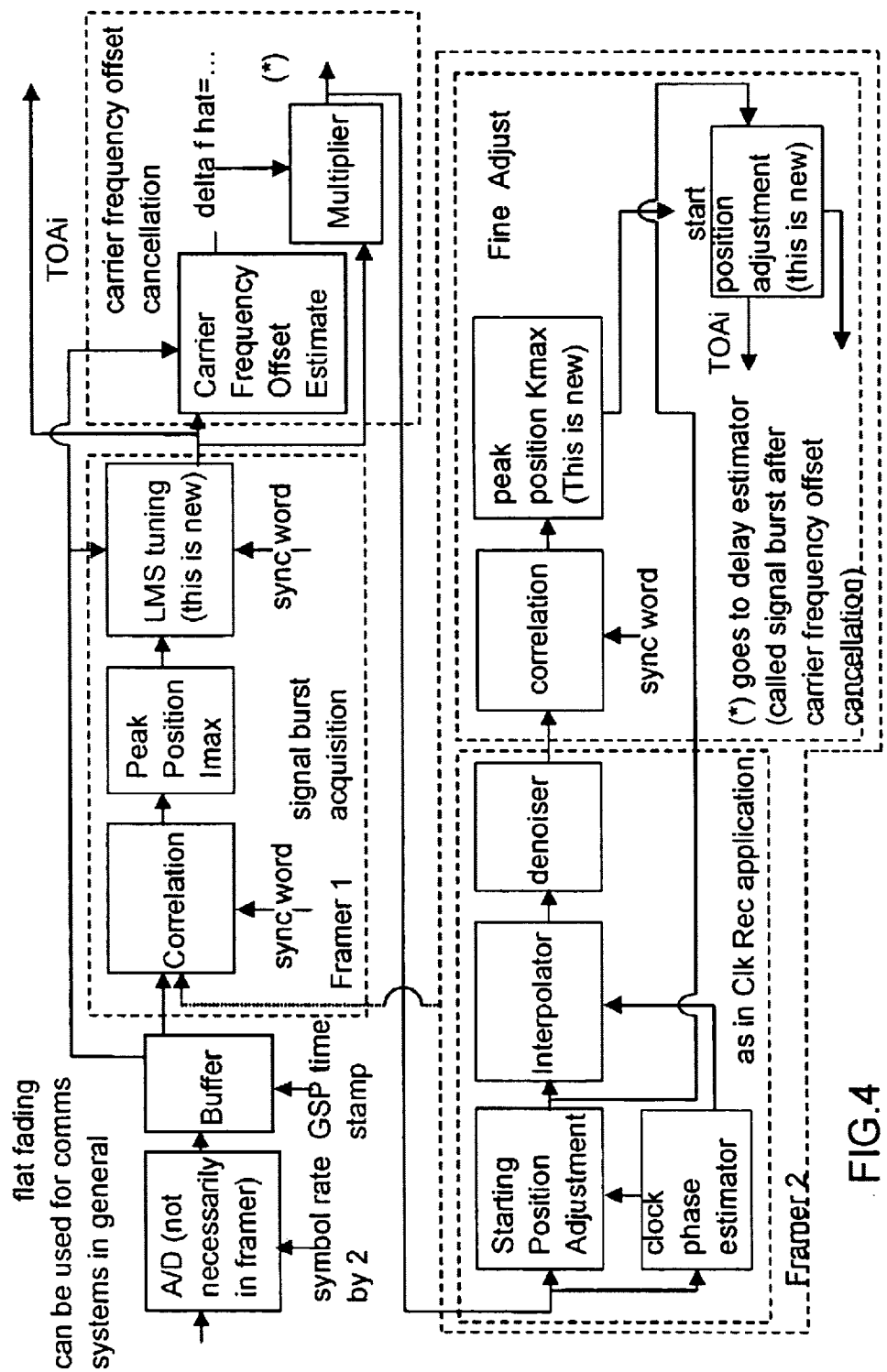
FIG. 4 is a more detailed block diagram of an embodiment of the invention for a flat fading channel.

An embodiment of the invention operates when the channel is a flat fading and dispersive channel. The systems is shown in FIG. 3 and FIG. 4.

The embodiment operates as follows.

Our invention basically works as below:

TDMA mobile signal is received by a wide-band digital receiver with the synchronized A/D converter at each cell site.

The received wide-band signal is then down-converted to the sampled baseband signal by a digital filter, which is buffered in baseband board with inserted GPS time stamps.

The Framer first uses SYNC word to grossly locate the signal burst boundary.

After the carrier frequency offset estimation and correction, the signal burst is then used by the clock phase estimator to estimate the sampling phase of the open-eye-sample sequence.

The grossly captured signal burst and the estimated sampling phase are used by the timing ambiguity solver to obtain two outputs: one is the raw data burst which contains the time delay information; the other is the open-eye-sample sequence derived from this raw data burst.

The starting position of the raw data burst is exactly aligned with the starting position of the open-eye-sample sequence.

The Framer uses the SYNC word again and correlates it with the derived open-eye-sample sequence.

From the resultant peak position, the Framer can find the starting position of the open-eye-sample sequence.

Since the starting position of the raw data burst is aligned with the starting position of the open-eye-sample sequence, the starting position of the raw data burst can thus be easily identified.

Since each raw data sample is time stamped by GPS receiver, the Framer can output the framed raw data burst and the time stamp of its starting position, TOAi.

The Time Delay Estimator will work on the framed raw data burst and output the intra-symbol delay estimate, TOAf, which will combined with the inter-symbol delay (TOAi) obtained from the Framer to form the final TOA estimate.

Estimation of Open-Eye-Sample Sequence

Estimation of the open-eye samples involves three steps: first the open-eye sampling phase is estimated by a Clock Phase Estimator; then the open-eye samples are constructed from the received raw data samples by an interpolator. The third step is to denoise the open-eye samples to reduce the effects of the inter-symbol interference due to the inaccurate estimation of the sampling phase, the co-channel interference, the interference introduced by the inaccurate interpolation, etc. One thing needs to be emphasized that during the process of constructing the open-eye samples, the starting position of the received raw data sequence must be aligned with the starting position of the open-eye-sample sequence. In the following discussion, we assume that the signal burst has been captured and the carrier frequency offset has been canceled.

Clock Phase Estimator

The function of the Clock Phase Estimator is to estimate the sampling phase of the received signal. Each of the real and imaginary parts of the input samples are first multiplied by the quadrature baud rate clocks $$y_I(n) = \text{real}\{x(nT/2)\}e^{jn\pi/2} \qquad \text{Eqn. 13}$$

$$y_Q(n) = \text{imag}\{x(nT/2)\}e^{jn\pi/2} \qquad \text{Eqn. 14}$$

which are then low pass filtered to remove the pattern jitter $$z_I(n+1) = cy_I(n+1) + (1-c)z_I(n) \qquad \text{Eqn. 15}$$

$$z_Q(n+1) = cy_Q(n+1) + (1-c)z_Q(n) \qquad \text{Eqn. 16}$$

where c=0.1. They are complex squared and summed $$z = \Sigma\{z_I(n)z_I(n) + z_Q(n)z_Q(n)\} \qquad \text{Eqn. 17}$$

The real and imaginary parts of are fed into the arctangent function to produce the open-eye sampling phase referenced to the first sample of the received signal $$\tau_1 = 0.5 + \text{arctg}(\text{imag}(Z), \text{real}(Z))/(2\pi) \qquad \text{Eqn. 18}$$

where arctg(X, Y) is the four quadrant arctangent of the real parts of the elements of X and Y. Since $-\pi \leq \text{arctg}(X, Y) \leq \pi$, $\tau_1$ is in the range between 0 to 1. Note that in Eqn. 18, $\text{arctg}(\text{imag}(Z), \text{real}(Z))/(2\pi)$ is the sampling phase of the first sample of the received signal, 0.5 is the sampling phase of the open-eye samples. As a result, $\tau_1$ is the open-eye sampling phase referenced to the first sample of the received signal, which means that the open-eye sampling position is delayed by $\tau_1 T$ referenced to x(1). Since the sampling rate is assumed to be 2/T, the open-eye sampling phase referenced to the second sample of the received signal can be calculated from $$\tau_2 = \begin{cases} \tau_1 + 0.5 & \text{if } \tau_1 < 0.5 \\ \tau_1 - 0.5 & \text{if } \tau_1 \geq 0.5 \end{cases} \qquad \text{Eqn. 19}$$

which means that the open-eye sampling position is delayed by $\tau_2 T$ referenced to x(2).

Alignment of the Received Signal Samples with the Open-Eye-Sample Sequence The criterion for selecting x(1) or x(2) to align with the starting position of the open-eye-sample sequence depends on which of them is closest to the open-eye sampling position. We define $$t_1 = \min(\tau_1, 1-\tau_1)$$

$$t_2 = \min(\tau_2, 1-\tau_2) \qquad \text{Eqn. 20}$$

If $t_1 < t_2$, we know that x(1) is closer to the open-eye sampling position, which is delayed by $\tau_1 T$ referenced to the position of x(1). The starting position of the open-eye sequence is aligned with x(1). If $t_1 \geq t_2$, we know that x(2) is closer to the open-eye sampling position, which is delayed by $\tau_2 T$ referenced to the position of x(2). The starting position of the open-eye sequence is aligned with x(2).

Interpolating the Open-Eye-Sample Sequence

After obtaining the starting position of the TDMA burst that is aligned with The starting position of the open-eye sequence and the corresponding open-eye sampling phase from the previous section, they are fed into an interpolator to produce the open-eye-sample sequence. There are a number of ways to do the interpolation. To reduce the computation, we introduce here a simple three-tap quadric interpolator. It works as follows: Choose the interpolation phase and the TDMA burst for interpolation $$\tau = \begin{cases} \tau_1 + 0.5 \text{ if } \tau_1 < 0.5 \\ \tau_2 + 0.5 \text{ if } \tau_1 \geq 0.5 \end{cases} \quad \text{Eqn. 21}$$

$$y(n) = \begin{cases} x(nT/2) \text{ if } t_1 < t_2 \\ x(nT/2 + T/2) \text{ if } t_1 < t_2 \end{cases} \quad \text{Eqn. 22}$$

Make interpolation phase adjustment based on $\tau_a = \tau + 0.5$ and K=1 if t<0.25

$\tau_a = \tau$ and K=2 if $0.25 \leq t < 0.25$  Eqn. 23

$\tau_a = -0.5$ and K=3 if t>0.75

Calculate the quadratic interpolating coefficients based on the adjusted interpolation phase $$c_1 = 1 - 3\tau_a + 2\tau_a^2$$
$$c_2 = 4\tau_a - 4\tau_a^2 \quad \text{Eqn. 24}$$
$$c_3 = -\tau_a + 2\tau_a^2$$

Pad appropriate number of zeros in front of the TDMA burst $$\begin{cases} z(k) = 0, k = 1, \ldots, K \\ z(K+n) = y(n), n = 1, 2, \ldots \end{cases} \quad \text{Eqn. 25}$$

Interpolate the open-eye samples $$S(n) = \begin{cases} c_3 z(2n+1) + c_2 z(2n) + c_1 z(2n-1) \text{ if } \tau > 0.5 \\ c_3 z(2n+3) + c_2 z(2n+2) + c_1 z(2n+1) \text{ if } \tau \leq 0.5 \end{cases} \quad \text{Eqn. 26}$$

$$n = 1, 2, \ldots$$

Denoising

The denoising process is to reduce the interference signals from the interpolated open-eye samples. These interference signals may be introduced by the inter-symbol interference due to the inaccurate estimation of the sampling phase, the co-channel interference, the interference introduced by the inaccurate interpolation filter, etc.

The denoising process is performed by normalizing the amplitude of the open-eye samples to one. Considering that the normalization process may not be necessary if the amplitude of S(n) is too small. First we calculate the averaged value of $$\bar{S} = \sum_{n=1}^{M} |S(n)|/M \quad \text{Eqn. 27}$$

Then we normalize the amplitude of S(n) to one if JS(n~ is greater than a threshold $$\begin{cases} \hat{A}(n) = S(n)/|S(n)| \text{ if } |S(n)| > \mu/\bar{S} \\ \hat{A}(n) = S(n) \text{ if } |S(n)| \leq \mu/\bar{S} \end{cases} \quad \text{Eqn. 28}$$

where $\mu$ is a positive scaling factor which is less than one. Fine Adjustment of the Starting Position of the Signal Burst After obtaining the denoised open-eye-sample sequence, it is correlated with the SYNC word around its SYNC word related portion of the samples $$R(k) = \left| \sum_{n=1}^{L} a_S(n) A(n+k)^* \right| \quad \text{Eqn. 29}$$

Its peak position is calculated from $$k_{max} = \arg \max\{R(k)\} \quad \text{Eqn. 30}$$

Since the signal burst is aligned with the open-eye-sample sequence, its starting position can be deduced from $k_{max}$.

System Operation

The operation of the system shown in FIG. 1 can be recursive. One of the framers 1 may receive the output of the other framer 1, i.e., fine signal burst, and frames the fine signal burst using a LMS tunning. The operation of the system shown in FIG. 3 can be recursive. The framer 1 may receive the output of the framer 2, i.e., fine signal burst, and frames the fine signal burst using a LMS tunning.

The TDOA based position location system requires a minimum of three cell sites to determine a unique position location. However, the cellular systems are often designed to ensure only one high signal-to-noise (SNR) link between a transmitting mobile and a base station. This is because in a conventional cellular system, the number of base stations to be installed and the interferences between adjacent cells must be minimized when first deploying the system. Although each cell site could independently detect the starting position of the signal burst sent form the mobile, it is desirable for the cell site that communicates with the mobile detects the starting position of the signal burst first and sends the result to the central office. The central office then broadcasts the detected starting position of the signal burst together with the locating command to all the associated cell sites.

While the present invention has been described in connection with what is presently considered to be the most practical and preferred embodiments, it is to be understood that the invention is not limited to the disclosed embodiments. To the contrary, the present invention is intended to cover various modifications, variations, adaptations and equivalent arrangements included within the spirit and the scope of the appended claims. The scope of the claims is to be accorded the broadest interpretation so as to encompass all such modifications and equivalent structures and functions.

What is claimed is:

1. A system for acquisition of a time stamped signal burst while preserving timing information, the system comprising:
   a. a first framer for framing a buffered signal burst using least mean squares tuning to produce a first time stamp;
   b. an offset frequency compensator for substantially removing a frequency offset from the first time stamp to produce a rough signal burst; and
   c. a second framer for framing the rough signal burst using least mean squares tuning to produce a fine signal burst and a second time stamp, the second time stamp being more reliable than the first time stamp.

2. The system recited in claim 1 wherein first framer also frames the fine signal burst using least mean squares tuning to produce the first time stamp.

3. The system recited in claim 1 wherein the first framer comprises:

a. a correlator for correlating the buffered signal burst using a SYNC word to produce a correlator output signal;

b. a peak position detector for detecting the peak position of the correlator output and producing a peak position signal; and c. a least mean squares tuner for determining first time stamp using a least mean squares algorithm.

4. The system recited in claim 1, wherein the second framer includes:

a correlator for correlating the rough signal burst using a SYNC word to produce a correlator output signal;

a peak position detector for detecting the peak position of the correlator output and producing a peak position signal; and a least mean squares tuner for determining the second time stamp using a least mean squares algorithm.

5. The system recited in claim 1 further comprising a time delay estimator for providing an intra-symbol delay estimate based on the output of the second framer.

6. The system recited in claim 5 wherein a module for combining the intra-symbol delay estimate with the second time stamp to form a final time of arrival (TOA) estimate.

7. A method of acquiring a time stamped signal burst while preserving timing information, the method comprising steps of:

a. framing a buffered signal burst using least mean squares tuning to produce a first time stamp;

b. substantially removing a frequency offset from the first time stamp to produce a rough signal burst; and c. framing the rough signal burst using least mean squares tuning to produce a fine signal burst and a second time stamp, the second time stamp being more reliable than the first time stamp.

8. The method recited in claim 7, further comprising a step of framing the fine signal burst using least mean squares tuning to produce the first time stamp.

9. The method recited in claim 7, wherein the buffered signal burst framing step includes steps of:

a. correlating the buffered signal burst using a SYNC word to produce a correlator output signal;

b. detecting the peak position of the correlator output signal and producing a peak position signal; and c. determining a first time stamp using a least mean squares algorithm.

10. The method recited in claim 7, wherein the rough signal burst framing step includes the steps of:

correlating the rough signal burst using a SYNC word to produce a correlator output signal;

detecting the peak position of the correlator output and producing a peak position signal; and determining the second time stamp using a least mean squares algorithm.

11. The method recited in claim 7 further comprising the step of providing an intra-symbol delay estimate based on the result of the rough signal burst framing step.

12. The method recited in claim 11 further comprising the step of combining the intra-symbol delay estimate with the second time stamp to form a final time of arrival (TOA) estimate.

13. A system for acquisition of a time stamped signal burst while preserving timing information, the system comprising:

a framer for locating a signal burst using a least mean square; an offset frequency compensator for substantially removing a frequency offset from the signal burst;

a clock phase estimator for estimating a sampling phase of an open-eye-sample sequence;

a module for processing the signal burst and the sample phase to provide raw data burst containing time delay information and the open-eye-sample sequence which is derived from the raw data burst; and a fine adjustment module for providing framed raw data burst and the time stamp of its starting position using the open-eye-sample sequence.

14. The system recited in claim 13, wherein the processing module includes a module for aligning the starting position of the raw data burst with the starting position of the open-eye-sample sequence and an interpolator for producing the open-eye-sample sequence from the raw data burst.

15. The system recited in claim 14, wherein the processing module further includes a denolsing module for denoising the open-eye-sample sequence.

16. The system recited in claim 13, wherein the fine adjustment module includes a module for finding the starting position of the open-eye-sample sequence and a module for identifying the starting position of the raw data burst.

17. The system recited in claim 13, wherein the framer includes:

a correlator for correlating the signal burst using a SYNC word to produce a correlator output signal;

a peak position detector for detecting the peak position of the correlator output and producing a peak position signal; and a least mean squares tuner for determining a time stamp of a staring position of the signal burst using a least mean squares algorithm.

18. The system recited in claim 13, wherein the fine adjustment module includes:

a correlator for correlating the open-eye-sample sequence using a SYNC word to produce a correlator output signal;

a peak position detector for detecting the peak position of the correlator output and producing a peak position signal; and a module for determining the time stamp of the starting position of the raw data burst using the peak position signal.

19. The system recited in claim 13 further comprising a time delay estimator for providing an intra-symbol delay estimate based on the framed raw data burst.

20. The system recited in claim 19 further comprising a module for combining the intra-symbol delay estimate with the time stamp to form a final time of arrival (TOA) estimate.

21. A method of acquisition of a time stamped signal burst while preserving timing information, the system comprising:

locating a signal burst using a least mean square;

substantlally removing a frequency offset from the signal burst;

estimating a sampling phase of an open-eye-sample sequence;

processing the signal burst and the sample phase to provide raw data burst containing time delay information and the open-eye-sample sequence which is derived from the raw data burst; and performing a fine adjustment to provide framed raw data burst and the time stamp of its starting position using the open-eye-sample sequence.

22. The method recited in claim 21, wherein the fine adjustment steps includes the steps of:

correlating the open-eye-sample sequence using a SYNC word to produce a correlator output signal;

detecting the peak position of the correlator output and producing a peak position signal; and determining the time stamp of the starting position of the raw data burst using the peak position signal.

23. The method recited in claim 21, further comprising the step of providing an intra-symbol delay estimate based on the framed raw data burst.

24. The method recited in claim 23 further comprising the step of combining the intra-symbol delay estimate with the time stamp to form a final time of arrival (TOA) estimate.

25. The method recited in claim 21, wherein the processing step includes the step of aligning the starting position of the raw data burst with the starting position of the open-eye-sample sequence and the step of performing interpolation to produce the open-eye-sample sequence from the raw data burst.

26. The method recited in claim 25, wherein the processing step further includes the steps of denoising the open-eye-sample sequence.

27. The method recited in claim 21, wherein the fine adjustment performing step includes the step of finding the starting position of the open-eye-sample sequence and the step of identifying the starting position of the raw data burst.

28. The method recited in claim 21, wherein the locating step includes the steps of:

correlating the signal burst using a SYNC word to produce a correlator output signal:

detecting the peak position of the correlator output and producing a peak position signal; and determining a time stamp of a staring position of the signal burst using a least mean squares algorithm.

* * * * *